United States Patent [19]
O'Meara

[11] 3,980,879
[45] Sept. 14, 1976

[54] ADAPTIVE IMAGING TELESCOPE WITH NONLINEAR QUADRANT SENSING AND ELECTRO-OPTICAL PHASE SHIFTING

[75] Inventor: Thomas R. O'Meara, Malibu, Calif.

[73] Assignee: Hughes Aircraft Company, Culver City, Calif.

[22] Filed: June 24, 1974

[21] Appl. No.: 482,187

[52] U.S. Cl. .............................. 250/201; 350/160 R
[51] Int. Cl.² ............................................ G01J 1/20
[58] Field of Search ............ 250/201, 202, 203, 578; 350/160, 162 R, 162 SF, 17, 205; 178/DIG. 25; 331/94.5

[56] References Cited
UNITED STATES PATENTS

| | | | |
|---|---|---|---|
| 3,316,800 | 5/1967 | Kibler | 250/201 |
| 3,594,660 | 7/1971 | Huggett | 331/94.5 |
| 3,612,698 | 10/1971 | Mathisen | 350/162 SF |
| 3,705,758 | 12/1972 | Haskall | 350/160 R |
| 3,713,042 | 1/1973 | Kinsel | 350/160 R |
| 3,739,174 | 6/1973 | Gloge | 250/201 |
| 3,790,901 | 2/1974 | White et al. | 350/160 R |
| 3,846,628 | 11/1974 | Towne | 250/201 |

*Primary Examiner*—David C. Nelms
*Attorney, Agent, or Firm*—Martin E. Gerry; W. H. MacAllister

[57] ABSTRACT

An adaptive imaging telescope having nonlinear sensing means for detecting an optical image received thereby. The system comprises a phase shifter, positioned at the aperture of the telescope or at an image plane thereof. This system also includes a nonlinear image quality sensor optically coupled to the phase shifter, consisting of a quadrant nonlinear detector wherein each detector element of the quadrant detector is responsive to light from the optical image, the quadrant detector comprising nonlinear photocells or detectors whose plane is positioned at an image plane of the telescope. The photocells are connected to a network for providing image quality error signals. Analog circuits are provided to receive the sensor output and provide a closed-loop return to the phase shifter.

21 Claims, 6 Drawing Figures

Fig. 5.
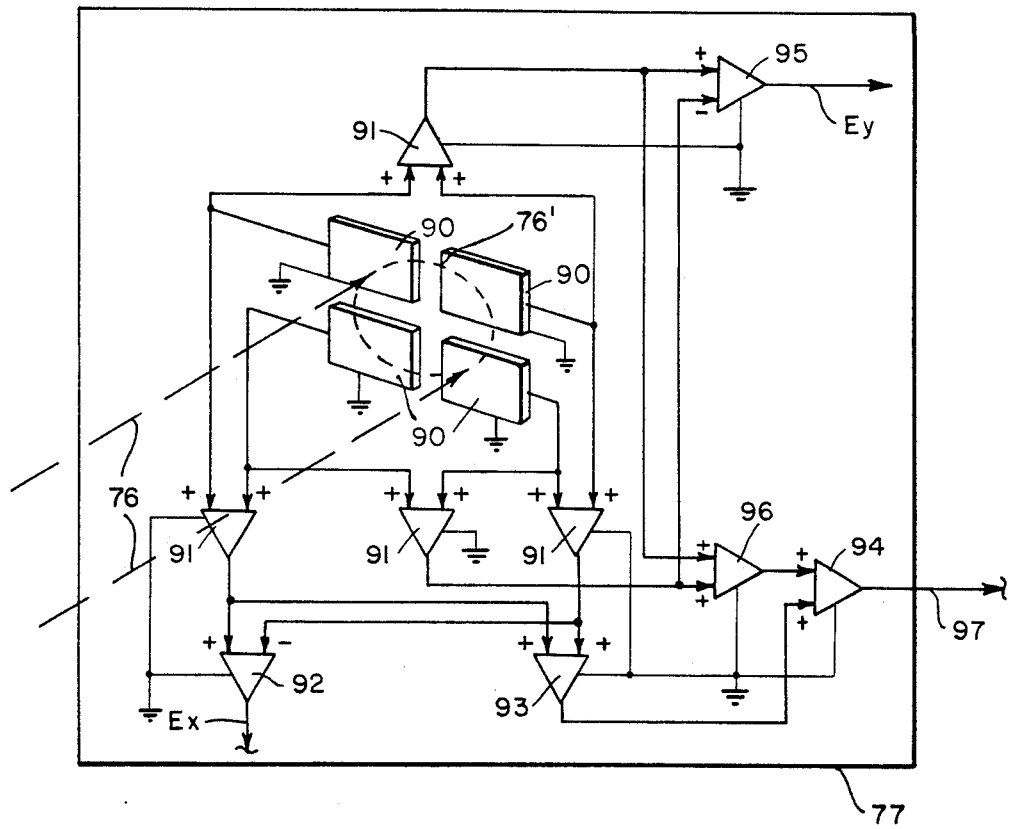
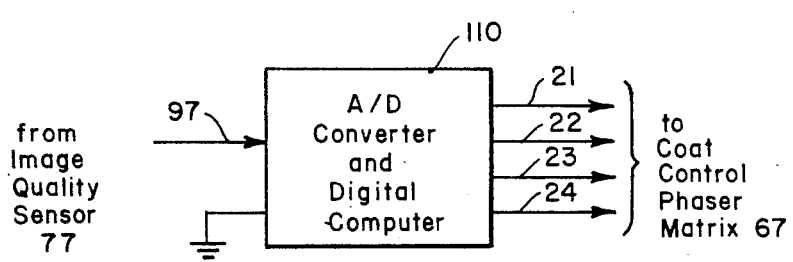
Fig. 4a.

ADAPTIVE IMAGING TELESCOPE WITH NONLINEAR QUADRANT SENSING AND ELECTRO-OPTICAL PHASE SHIFTING

CROSS-REFERENCE TO RELATED COPENDING APPLICATIONS

Applications, Ser. Nos. 482,175; 482,185; 482,186; and 482,188 were all filed June 24, 1974, concurrent with this application.

BACKGROUND OF THE INVENTION

This invention is in the field of adaptive imaging telescopes, and in particular such telescopes that compensate for images viewed through atmospheric turbulence.

The atmosphere has a substantially uniform effect on a portion of a wavefront impinging on a small aperture, say four inches or less in diameter at visible wavelengths. The impinged wavefronts can be decomposed into phase effects, and amplitude or scintillation effects. The phase effects are of major importance, causing a spatially and time-varying random advance or retardation of the wavefront which can easily be as large as several times $2\pi$ radians.

In large telescopes the first effect mentioned is overwhelmingly troublesome. More specifically, the subapertures may be paired, and it may be shown that each pair of subapertures generates its own characteristic Fourier component fringe pattern. In the distortionless propagation case, all of these fringe patterns add constructively at the image center and effectively add more and more destructively at positions in the image plane progressively removed from the center. Since the first mentioned effect can change either the position of the fringes or the phase of the optical carrier which is spatially modulated by them, it can readily happen that the desired constructive interference on axis, and destructive interference off axis, is not obtained. Consequently, peak image intensity is reduced and the image is not narrowed by the superposition of fringe patterns, or at least it is not narrowed to the full potential of the system. Thus, images are smeared out by these atmospheric effects and imaging through long atmospheric paths with apertures exceeding four inches is usually limited by this phenomenon rather than by the optics of the imaging system.

Prior art systems have employed several restoration schemes. One classificational scheme is post-film-recording or restoration systems, and pre-film-recording or pre-correction systems. By far, the largest number of schemes have been of the post-film-recording category and, as one consequence, have not been real-time systems. Of the pre-film-recording techniques, holographic methods have been the most widely explored, and again these have not been in real time. Many suggested techniques, including holography have required a reference, that is a known, ideally, a small source to one side of the unknown source object. In most practical cases an ideal reference natural source is simply not available.

SUMMARY OF THE INVENTION

It is, therefore, an object of the instant invention to reduce the image smearing results by introducing corrective phase control across the receiving aperture which effectively restores the desired fringe superposition, and hence the clarity of the resultant image.

Another object of the instant invention is to eliminate the need for an adjacent reference source, nor a priori, make assumptions that symmetrical source distributions exist in the assumed source.

A further object is to provide a real-time operative system. That is, image corrections in the instant system must be accomplished within $10^{-2}$ seconds, since the atmosphere may substantially change in a period not much greater than this time period.

A still further object is to provide a system fully compatible with post-film-recording restoration techniques, which when combined with the instant invention extend thereto an additional benefit.

Accordingly, the instant invention employs separate aperture phase shifters to introduce equal and opposite (time-varying) phase shifts across the aperture in such a way as to compensate for the atmospheric shifts. For example, in astronomical imaging the image is to be made as bright and sharp as possible. To achieve this purpose we need a measure of the image contrast or sharpness and also we require a technique for maximizing it with respect to the control variables, such as the phase delay applied to the waves as received at each subaperture. The measure of contrast is best understood by the one-dimensional image point intensity distributions as stated in equation (1) below. Although the point spread functions of individual samples of atmospheric disturbed images are distinctly nongaussian, the time average of such functions tends to be gaussian so we illustrate them as gaussian. Of more importance, the integrals of the intensity distributions tend to be a constant independent of the magnitude of the atmospheric disturbance since the phase errors only redistribute the total energy in the image plane. Thus, if we integrate the total source image intensity under high and low turbulence conditions, we obtain essentially the same result. For example, if the image intensity distribution is gaussian, then $$I = a\, e^{-|a(x-x_0)|^2} \tag{1}$$

and the integrated intensity distribution, I, does not change between sharp images (high values of $a$) and diffuse images (low values of $a$). On the other hand, if we use a "nonlinear" detector wherein the current or voltage increases at a higher rate than linear, with optical intensity, a quite different result is obtained. In particular, the squared integrated optical intensity, J, hereinbelow defined, for example, increases linearly with $a$, that is, in proportion to pattern sharpness or narrowness. Note that this measure of pattern sharpness does not require one to determine where in the image plane the brightest portion of the image is located, since it functions equally well for any value of $x_0$, reasonably removed from an edge. In fact, it is true as well for a number of isolated image spots in arbitrary locations. For two images which have substantial overlap (under high distortion or noncorrected conditions), the matter is not so obvious, although the essential conclusions remain true. Therefore, in this particular approach, it is proposed to employ the integral of the square (or other nonlinear functional form) of the image intensity distribution as a function of the various aperture phase controls.

This integration may be accomplished, for example, by simply placing a nonlinear photocell in the image plane of sufficient area to overlap the image intensity distribution curve of the squared optical intensity. The detected outputs then provide error signals for driving the phase shifters in such a way that the detector output is maximized. More particularly, these phase controls may be dithered at distinctive sinusoidal rates, with separate synchronous detection of each of the induced amplitude components in the nonlinear detector output.

Although the image is well formed with use of the instant system, it may still exhibit considerable jitter (sidewise motion) from time-varying tilts in the arriving wavefront. In order to overcome this deficiency, one may split the nonlinear detector into four quadrants to form a nonlinear quadrant detector. The separate outputs are linearly combined to form a "summation" nonlinear output which provides the basic image quality measure while differential outputs $E_x$ and $E_y$ provide a measure of image displacements in the $x$ and $y$ directions. In particular, these signals may be used as error signals for feeding and controlling a tilting mirror or a pair of tilting mirrors in a servo loop which drives the $E_x$ and $E_y$ signals to zero, that is, which holds the image centroid centered on the quadrant detector system.

BRIEF DESCRIPTION OF THE DRAWINGS

FIG. 4a shows alternate digital computer usage in the instant system in lieu of analog circuitry used therein.

FIG. 5 shows a nonlinear image quality quadrant sensor employing nonlinear detection units used as the image quality sensor subsystem in accordance with this invention.

DETAILED DESCRIPTION

General Theoretical Basis

Figure 1:
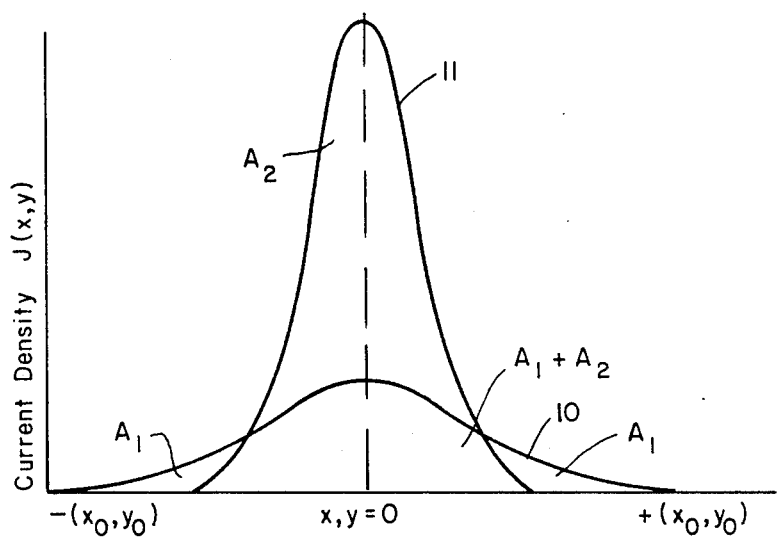
FIG. 1 is response curve of the nonlinear sensor current density in the image plane showing the effect of improved image quality output in accordance with this invention.

Referring to FIG. 1, though for convenience, it was simpler to state the gaussian image intensity distribution in equation (1) as a function of a single spatial variable x; actually the detector current is a function of the integral or current density J, which is a function of the square of the optical intensity I, varying in two dimensions, $x$ and $y$, which may be stated in terms of the areas under curves 10 or 11 as:

$$\text{Total Current} = K \int_{-(x_0,y_0)}^{+(x_0,y_0)} [J(x,y)]^2 dx\, dy \qquad (2)$$

where the width of the distorted image represented by curve 10 is less than $2|x_0|$ in the x direction and $2|y_0|$ in the y direction, and $K$ is a scaling constant.

The integral as in (2) represents area $A_1$ under the uncompensated or distorted curve 10 and is much smaller than area $A_2$ under compensated curve 11. The corresponding net detector current in the uncompensated case being much less than in the compensated case.

Figure 2:
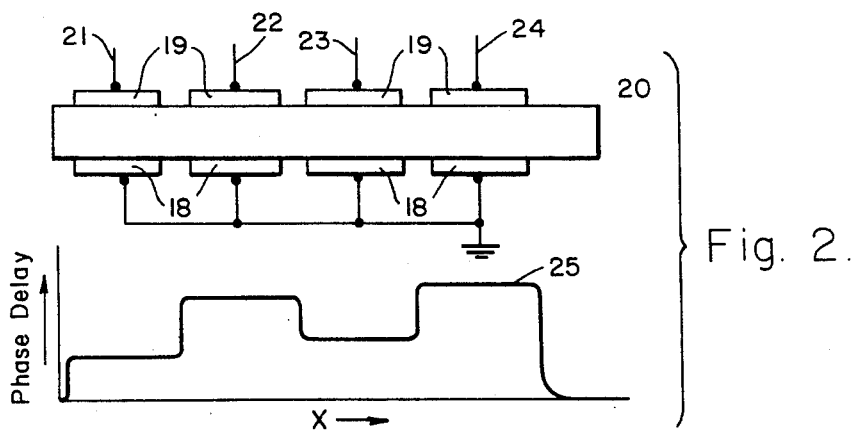
FIG. 2 is an elevation view of a phase shifter and corresponding response curve of phase delay as a function of discrete step phase variation, used in a phaser matrix of the inventive system.
Figure 3:
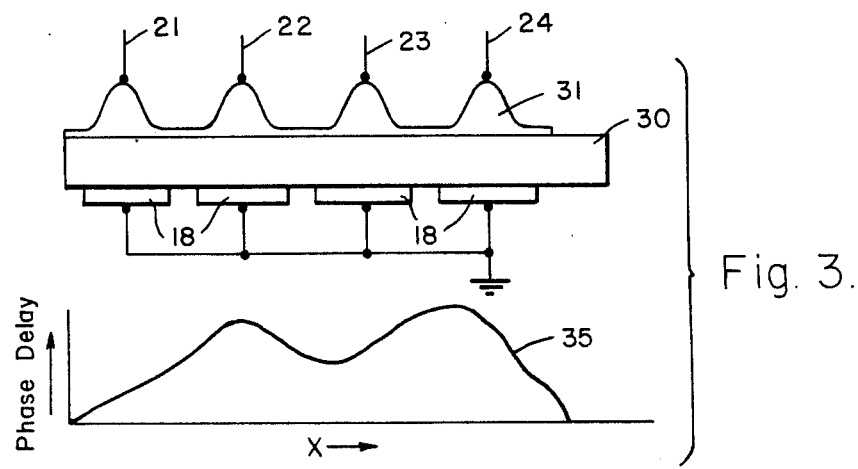
FIG. 3 is an elevation view of a phase shifter with a modified electrode structure together with its corresponding response curve of phase delay used in lieu of phase shifter of FIG. 2 and providing smooth phase variation with respect to phase delay.

Referring to FIGS. 2 and 3, it may be stated that although it is convenient for discussion purposes to assume rectangular step phase errors and rectangular step phase correcting devices, in fact, it is to be expected that the phase errors are smoothly varying functions of position and that it is more efficient (in terms of correction quality to introduce corresponding phase error-correcting devices which present a more smoothing varying correction with space than rectangular steps. Thus, for example, with an electro-optical (field dependent) phase shifter, one might employ electrode patches of relatively high conductivity coupled by areas of low conductivity such that the fields and hence the phase shifts vary smoothly from point to point.

Accordingly, FIG. 2 shows the structure comprising a crystal of the KDP type made of $KH_2PO_4$ material as at 20 with electrically conductive transparent electrodes 18 and 19 at the major surfaces of the crystal. Such electrodes may be optically transparent if required, and the index of refraction of the crystal may be varied in known manner by applying different voltages of either AC or DC type by means of wires 21, 22, 23 and 24 attached to electrodes 19 and ground return at electrodes 18, to result in phase delay as a function of discrete step variation as shown in curve 25. KDP type crystals are described by A. Yariv, in Chapters 18 and 19 of Quantum Electronics, John Wiley and Sons, New York, 1967.

FIG. 3, on the other hand, shows the same KDP type crystal at 30 with only a plurality of electrically conductive transparent electrodes 18 at one surface thereof and a special electrically conductive transparent electrode 31 of nonuniform surface height attached to crystal 30. The peaks of electrode 31 are attached to wires 21, 22, 23 and 24 to enable application of different voltages of either AC or DC between these wires and ground return at electrodes 18 so as to vary the applied field and hence the phase delay smoothly rather than discretely as in FIG. 2 and thereby obtain response curve as at 35.

Proof That The Image Integral Squared Intensity Maximizes For A Corrected Aperture The image may be given by the convolution of the aperture point-spread-function (PSF) with the source distribution intensity. Such convolution formula was developed in Chapter 5 of "Introduction to Statistical Optics", by O'Neill, Addison-Wesley, Reading, Mass., 1963, which states:

$$I(\underline{X}) = S(\underline{X}) \circledast \overline{PSF}(\underline{X}) \qquad (3)$$

where $\underline{x}$ is the displacement in the image plane and $\circledast$ denotes convolution. The aperture point-spread-function (PSF) for a perfect circular aperture (and distortion free path) is given by the well known Airy disk as in "Introduction to Statistical Optics", or for a perfect annular aperture as developed in "Applied Optics", January 1974 issue by Tschunko, is:

$$I = (1-a^2)^{-2} \left[ \frac{2J_1(r)}{r} - \frac{a^2\, 2J_1(ar)}{(ar)} \right]^2 \qquad (4)$$

where $a$ is the central obscuration ratio.

For a more general aperture with path length index distortion $\Delta l(\underline{x})$ the aperture field from a point source is:

$$\mathscr{E} a(\underline{x}) = \exp[i \mathscr{E}(\underline{x})] = \exp\left[i \frac{2\pi}{\lambda} \Delta l(\underline{x})\right] \quad (5)$$

and the PSF is given by the publication of "Introduction to Statistical Optics", which states:

$$\overline{PSF}(x) = F^{-1}[\mathscr{E} a(\underline{x}) \circledast \mathscr{E} a^*(\underline{x})] \quad (6)$$

where $F^{-1}$ is the inverse Fourier transform operator. The intensity of (3) may be represented by a field $E(\underline{X})$ where $$I(\underline{X}) = |E(\underline{X})|^2 \quad (7)$$

while the aperture plane field distribution (at any optical frequency) is given by the Fourier transform of the image fields $E(\underline{X})$.

By Parsevals' theorem $$\int I^2(\underline{X}) \, d\underline{X} = \int |E(\underline{X})|^4 \, d\underline{X} = \int \{F[I(\underline{X})]\}^2 \, d\underline{X} \quad (8)$$

where $F$ denotes the Fourier transform operator. By the convolution theorem and (6)

$$F[I(X)] = [F(S)][Ea(x) \circledast Ea^*(x)] \quad (9)$$

such that (8) becomes $$\int I^2(\underline{X}) \, dX = \int [s(\underline{x})]^2 \left| \mathscr{E} a(\underline{x}) \circledast \mathscr{E} a^*(\underline{x}) \right|^2 d(\underline{x}) \quad (10)$$

where $s(x)$ is the transform of the source distribution. Substituting from (5) and expressing the convolution of (10) as an integral gives $$\int I^2(\underline{X}) \, d\underline{X} = \int d\underline{x} [s(\underline{x})]^2 \left| \int \exp i[\beta(\underline{y}) - \beta(\underline{y} - \underline{x})] d\underline{y} \right|^2 \quad (11)$$

The first factor in (11) is solely determined by the image distribution and is not subject to variation. The second factor maximizes for every $\underline{x}$, when $$\beta(\underline{y}) = \beta(\underline{y} - \underline{x}) \quad (12)$$

in other terms when all $\Delta l(\underline{x})$ are equal, for every $\underline{x}$.

All terms in equations (3) – (12) are defined in the quoted references for "Introduction to Statistical Optics."

An exception occurs when $s(\underline{x})$ vanishes at one or more values of $\underline{x}$. For these cases it does not matter if (12) is satisfied, since no contribution to the integral occurs from these terms. In other words, particular spatial frequencies in the aperture modulation transfer function (MTF) result is obtained from certain sets of elements spaced at the associated distance. If the associated spatial frequency from the source is not present and does not drive the MTF, then it does not matter if these elements are in phase or not.

Mechanization

Figure 4:
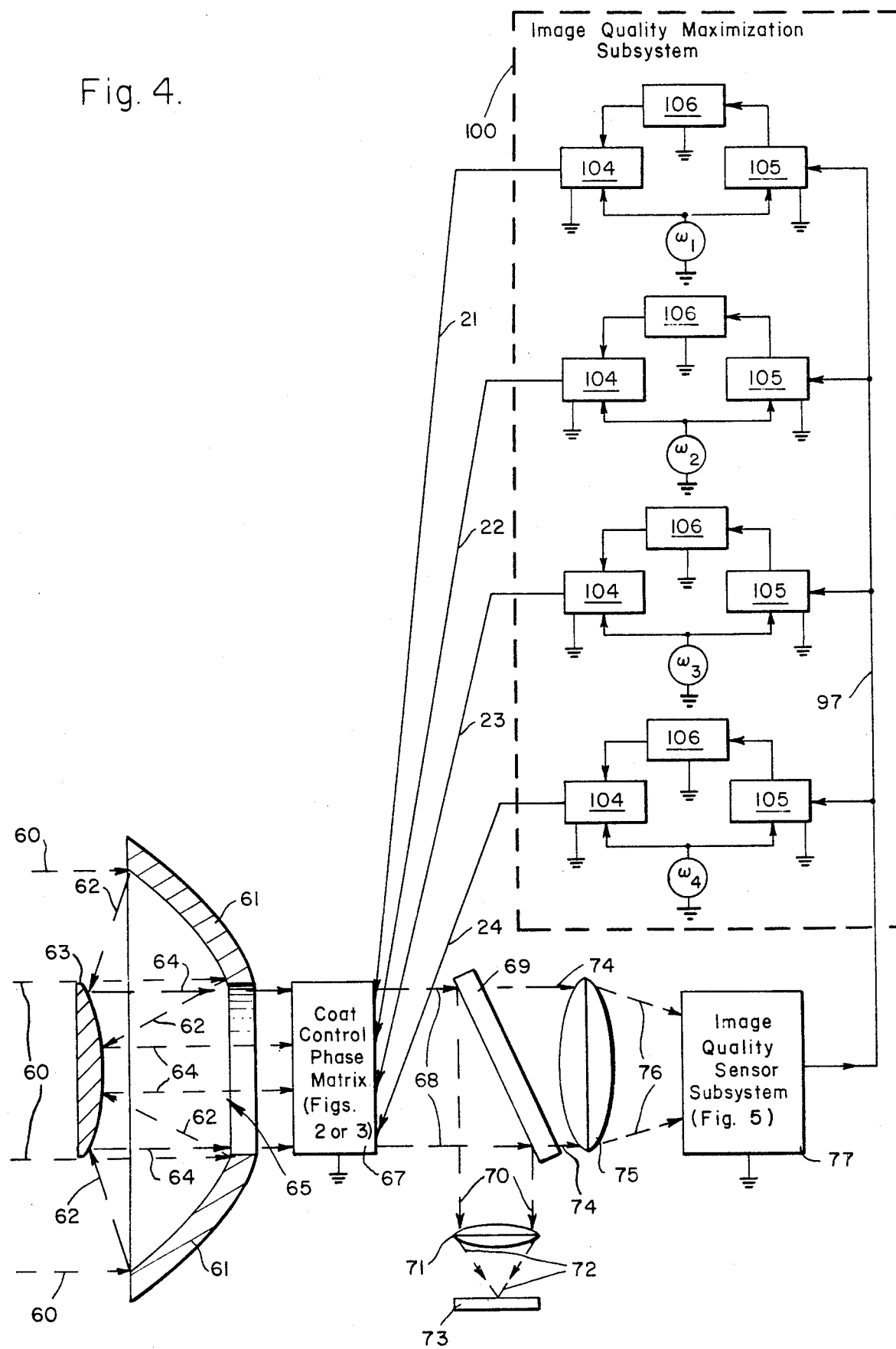
FIG. 4 is an optical-electrical schematic of the adaptive imaging telescope representing nonlinear sensing.

Referring to FIG. 4, a system schematic utilizing the inventive techniques provides an overview of the apparatus needed to achieve the desired results.

In the system illustrated in FIG. 4, the output of the image quality sensor is used to provide an indirect measure of the path errors in the separate elements of the phaser matrix. One maximizes a quantitative measure of image quality or sharpness, output at 97 over the allowable range of phaser matrix path length variations. In this way path length differences are driven to zero.

As an aid to the maximization process, it is generally helpful for the control system to have the ability to introduce trial path length perturbations, as explicitly illustrated in FIG. 4.

The manner in which the element perturbation system 100 functions need not be discussed extensively since such system is discussed in detail in U.S. Pat. No. 3,731,103. Briefly, system 100 comprises four different electronic circuits, each circuit being fed by a different frequency, $\omega_1$, $\omega_2$, $\omega_3$ and $\omega_4$ respectively. Each said circuit is responsive to the appropriate feeding frequency via connecting wire 97 which feeds operational amplifier 104 and synchronous detector 105. Output of detector 105 feeds a low pass filter 106. Generally, the pass band is chosen to give a closed loop response ranging between 100–1000 Hz. The output of filter 106 also feeds operational amplifier 104. In each of these electronic circuits, outputs 21, 22, 23 and 24 from the operational amplifiers, are provided as inputs to the elements of matrix 67.

Hence, referring to FIGS. 4 and 5, an optical beam as at 60 is reflected from telescope reflector 61 and impinged as beam 62 on reflector 63, to be directed by reflector 63 as beam 64 exiting through aperture 65 in reflector 61 and to impinge upon the elements of COAT control phaser matrix 67.

The elements of matrix 67 may be those shown in FIG. 2 or those in FIG. 3, as hereinabove described.

Optical beam as at 68 is propagated through the matrix elements of FIGS. 2 to 3 to impinge upon and be reflected from beam splitter 69 to be split as beam 70 entering lens 71, to exit from lens 71 as beam 72 and to impinge as a normal image upon a photographic plate or the like as at 73.

The other portion of beam 68 is directed through beam splitter 69 as beam 74 through lens 75 to impinge as beam 76 on image quality sensor assembly 77.

Sensor assembly 77 is comprised of the configuration shown in FIG. 5. A plurality of four nonlinear sensors, as at 90, are used in the specific sensor assembly illustrated.

Referring to FIG. 5, four detector elements as at 90 may be used as an image quality sensor 77 referred to in FIG. 4 to respond to optical beam 76. This mechanization utilizes the entire image, as compared to selected peaks, and consequently, is fully automatic. This method comprises the quadrant detector, which is connected in a sum and difference manner which extracts DC $x$ and $y$ error voltages whose magnitude and sign depend on the displacement of the intensity-squared pattern centroid from the quadrant center in the X and Y directions. This is the same intensity squared function J referred to in equation (2). These error voltages may be used to control an image recentering deflecting mirror. Alternatively, the error signals generate linear phase shifts across the arriving wavefront via the phase control matrix which effectively tilts the arriving wavefront in such a way that the original tilt (at that moment in time) is effectively removed; that is, the pattern is recentered on the quadrant center.

Four photocells are provided as at 90, each responsive to beam 76. Image 76' is formed by beam 76 on the surface of photocells 90. Each of the photocells are generally a semiconductor photosensitive material, or cadmium sulfide. Each of the photocells provide an output level so that two output levels are arithmetically added by each of the adders 91. Two oppositely disposed adders 91 provide inputs to subtractor 92 which provides an output at $E_x$ for X direction image centering error control. The same two adders provide inputs to another adder 93, which adder 93 provides one input to adder 94. The other pair of oppositely disposed adders 91, each provide inputs to subtractor 95 and adder 96. Adder 96 provides an output signal at $E_y$ for Y direction image centering error control. Subtractor 95 provides the other input to adder 94, so that at the output of adder 94 at 97 error signals are provided to control the dither frequency.

The separate outputs from all four photocells 90 are linearly combined to form a "summation" nonlinear output at 97 which provides the basic image quality measure while differential outputs $E_x$ and $E_y$ provide a measure of image displacements in the X and Y directions. In particular, these signals may be used as error signals for feeding and controlling a tilting mirror (not shown) or a pair of tilting mirrors in a servo loop which drives the $E_x$ and $E_y$ signals to zero, that is, which holds the image centroid centered on the quadrant detector system.

Accordingly, error signals may be provided from the several detectors at 97 as outputs of the image quality sensor 77 to provide inputs to analog system 100. System 100 will compute the error signal by synchronously detecting same with low frequency signals fed to perturbation circuits within system 100. These error signals amplitude modulations at 97, with the several low frequencies $\omega_1, \omega_2, \omega_3, \omega_4 \ldots \omega_n$, appear as a consequence of perturbation system 100. Output of these circuits are provided at 21, 22, 23 and 24 to connect to the complementary number of like numbered wires of FIGS. 2 or 3 so that the signals at 21–24 will impinge on either crystals 20 or 30 to phase modulate the optical signal (passing from telescope output through telescope aperture 65) in order to provide the corrective action and improved image quality.

A summation output from all four elements of the quadrant detector, is used to extract the remaining error signals and separate dither modulations on each element as a means of discerning phase error corrections for this particular element of the matrix phase control. Horizontal and vertical image centering is provided at $E_x$ and $E_y$ respectively. The resulting error correction signals at 97 (after detection) are supplied to the separate elements of the phase control matrix of FIGS. 2 or 3 via the circuits of element perturbation subsystem 100.

Referring to FIG. 4a, an alternate system utilizing a digital computer as at 110 may be substituted in FIG. 4 for subsystem 100. Inputs to computer 110 constitute the same outputs from image quality sensor 77, and the outputs from computer 110 constitute inputs 21, 22, 23 and 24 to control phaser matrix 67.

In the foregoing discussion, a method was provided for sensing the peakedness in an optical distribution via a nonlinear photodetector. Thus, defocused or blurred images which result from atmospherically distorted wavefronts or other optical distortions were illustrated which typically have substantially the same optical flux as an ideally focused or phased image, but with a less peaked distribution. This invention enables the detection of this redistribution in optical flux. Although the majority of optical photodetectors are not sensitive to the distribution, responding only to the integrated flux impinging on them, it is pointed out that a photodetector which is intrinsically or homogeneously nonlinear is sensitive to the distribution. Although photoconductors are known which exhibit the desired non-linearity at high flux levels, not all imaging system can achieve the desired flux levels.

Consequently, photocells as at 90 can be constructed which exhibit the desired sensitivity to flux distribution. One simple geometry which may be commonly employed is a thin film photoconductive square, such as of CdS, with thin strip electrodes along opposite edges of the square. This photodetector has been described by Crane and Bliss in "Optical and Electro-optical Information Processing" (MIT Tech. Press, Cambridge, 1965), p. 634, and has independently been tested elsewhere, including the Hughes Research Laboratories. More specifically, it has been demonstrated that the conductance of such a cell is sensitive to focus-defocus adjustments of the usual type. This holds true for a wide class of complex images. Such a thin film device provides the functional equivalent of the nonlinear detectors previously cited when employed as an image quality sensor.

In the foregoing figures hard wire electrical signal return path is illustrated by the conventional ground symbol.

What is claimed is:

1. In an adaptive imaging telescope for detecting an optical beam received thereby, comprising in combination:
   a phase shifter, including a planar crystal having two major surfaces and a plurality of electrodes attached to the major surfaces, which phase shifter is positioned in a focal plane, which focal plane is one of the planes within the depth of focus region of the aperture of the telescope, responsive to an optical image communicated by said optical beam;
   first means optically coupled to the phase shifter, comprising a nonlinear quadrant detector where each quadrant of the quadrant detector is responsive to light from the optical image, said quadrant detector comprising photocells which are positioned substantially orthogonally to said optical beam in a plane defined by X and Y ordinates, and a network to which said photocells are connected, for providing electrical error signals as output of said network; and
   second means, electrically coupling said network to the first means, for providing phase modulation of said optical beam.

2. The invention as stated in claim 1, wherein the planar crystal is of the electro-optic type, and wherein the plurality of electrodes comprises a first plurality of electrodes attached to one of the major surfaces, and a second plurality of electrodes attached to the other of the major surfaces opposite to said one of the major surfaces, for providing phase delay of the received optical image in discrete steps.

3. The invention as stated in claim 2, wherein said network includes means for positioning the optical image along said X and Y ordinates.

4. The invention as stated in claim 2 wherein said electrodes are of electrically conductive optically transparent material.

5. The invention as stated in claim 2, including:
   an optical beam splitter; and an optical beam focusing lens, said beam splitter being positioned in line with the optical image and angularly positioned with respect to the phase shifter and the focusing lens, said beam splitter and focusing lens being both positioned intermediate the phase shifter and first means.

6. The invention as stated in claim 5, including:
another lens responsive to light reflected from the beam splitter; and
means for photographing a received image by virtue of the light communicated through said another lens.

7. The invention as stated in claim 1, wherein the network comprises:
first and second oppositely disposed pairs of a group of adder circuits electrically connected to outputs of the photocells;
a subtractor circuit responsive to electrical output from the first pair of the group of adder circuits for algebraically summing the outputs of the photocells; and
a second adder circuit, responsive to electrical outputs of the first pair of the group of adder circuits, and to electrical outputs originating at pairs of the photocells which are aligned along either of the ordinates.

8. The invention as stated in claim 7, wherein said network includes:
another subtractor circuit responsive to outputs from the second pair of the group of adder circuits for providing image positioning along the X ordinate; and
a third adder circuit, responsive to outputs from the first pair of the group of adder circuits, for providing image positioning along the Y ordinate.

9. The invention as stated in claim 7, wherein said plurality of electrodes is a first plurality of electrodes attached to one of the major surfaces and a second plurality of electrodes attached to the other of the major surfaces opposite to said one major surface, for providing phase delay of the received optical image in discrete steps.

10. The invention as stated in claim 9, wherein said electrodes are of electrically conductive optically transparent material.

11. The invention as stated in claim 7, including:
an optical beam splitter; and
an optical beam focusing lens, said beam splitter being positioned in line with the optical image and angularly positioned with respect to the phase shifter and the focusing lens, said beam splitter and focusing lens being both positioned intermediate the phase shifter and first means.

12. The invention as stated in claim 11, including:
another lens responsive to light reflected from the beam splitter; and means for photographing a received image by virtue of the light communicated through said another lens.

13. The invention as stated in claim 1, wherein the planar crystal is an electro-optic type, and wherein the plurality of electrodes comprises a multiple number of electrodes attached to one of the major surfaces, and an electrode of non-uniform surface height attached to the other of the major surfaces opposite to said one of the major surfaces, for providing smoothly varying phase delay of the received optical image.

14. The invention as stated in claim 13, wherein said electrodes are of electrically conductive optically transparent material.

15. The invention as stated in claim 13, wherein said network includes means for positioning the optical image along said X and Y ordinates.

16. The invention as stated in claim 13, including:
an optical beam splitter; and
an optical beam focusing lens, said beam splitter being positioned in line with the optical image and angularly positioned with respect to the phase shifter and the focusing lens, said beam splitter and focusing lens being both positioned intermediate the phase shifter and first means.

17. The invention as stated in claim 16, including:
another lens responsive to light reflected from the beam splitter; and
means for photographing a received image by virtue of the light communicated through another lens.

18. The invention as stated in claim 7, wherein the planar crystal is an electro-optic type, and wherein the plurality of electrodes comprises a multiple number of electrodes attached to one of the major surfaces, and an electrode of non-uniform surface height attached to the other of the major surfaces opposite to said one of the major surfaces, for providing smoothly varying phase delay of the received optical image.

19. The invention as stated in claim 18, wherein said electrodes are of electrically conductive optically transparent material.

20. The invention as stated in claim 18, including:
an optical beam splitter; and
an optical beam focusing lens, said beam splitter being positioned in line with the optical image and angularly positioned with respect to the phase shifter and the focusing lens, said beam splitter and focusing lens being both positioned intermediate the phase shifter and first means.

21. The invention as stated in claim 20, including:
another lens responsive to light reflected from the beam splitter; and
means for photographing a received image by virtue of the light communicated through said another lens.

* * * * *

UNITED STATES PATENT OFFICE
CERTIFICATE OF CORRECTION

PATENT NO. : 3,980,879
DATED : September 14, 1976
INVENTOR(S) : THOMAS R. O'MEARA It is certified that error appears in the above-identified patent and that said Letters Patent are hereby corrected as shown below:

IN THE SPECIFICATION:

| COLUMN | LINE | DELETE | SUBSTITUTE |
|--------|------|--------|------------|
| 2 | 47 | guite | quite |
| 3 | 55 | or | of |
| 3 | 67 |  |  |
| 5 | 2 | $\Delta 1(\underline{x})$ | $\Delta \ell(\underline{x})$ |
| 5 | 46 | $\Delta 1(\underline{x})$ | $\Delta \ell(\underline{x})$ |

IN THE CLAIMS:

*The preamble of Claim 1, Column 8, lines 30-32 should read:

1. An adaptive imaging telescope for detecting an optical beam received thereby comprising in combination:

Signed and Sealed this

Twenty-fifth Day of January 1977

[SEAL]

Attest:

RUTH C. MASON
Attesting Officer

C. MARSHALL DANN
Commissioner of Patents and Trademarks